P. GIOVANNINI.
Double Gate or Valve.
No. 232,888. Patented Oct. 5, 1880.
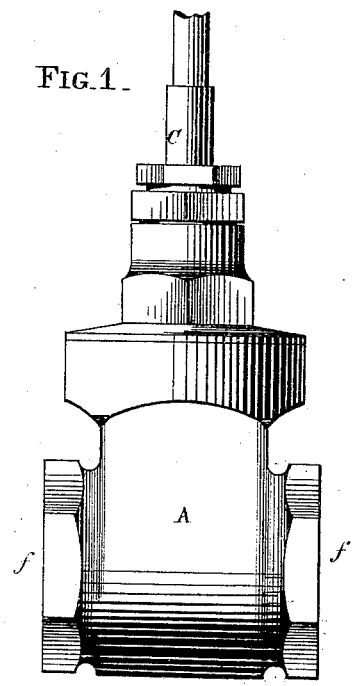
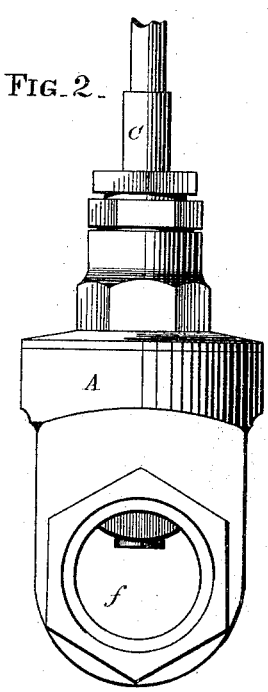
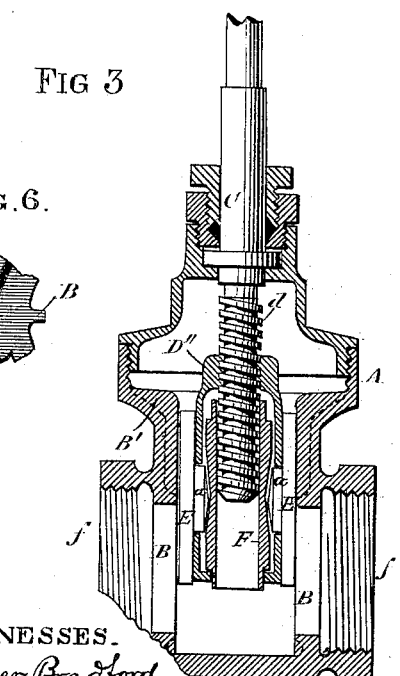
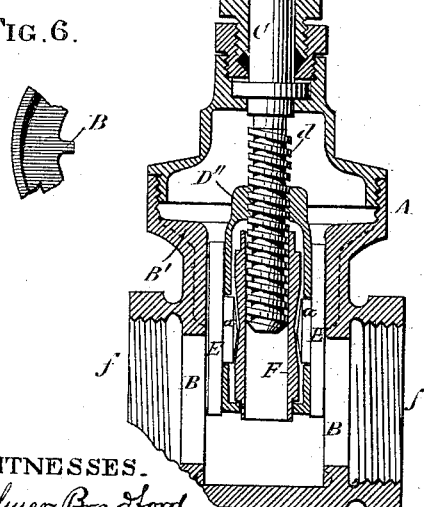
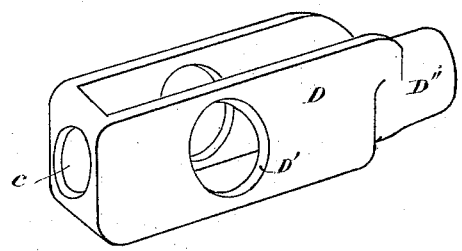
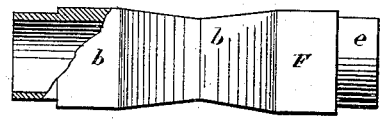
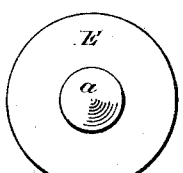
WITNESSES.
Wilmer Bradford
E. McClain
INVENTOR.
Philip Giovannini
By C. W. M. Smith, atty.

UNITED STATES PATENT OFFICE.

PHILIP GIOVANNINI, OF SAN FRANCISCO, CALIFORNIA.

DOUBLE GATE OR VALVE.

SPECIFICATION forming part of Letters Patent No. 232,888, dated October 5, 1880.

Application filed November 28, 1879.

*To all whom it may concern:*

Be it known that I, PHILIP GIOVANNINI, of San Francisco, in the county of San Francisco and State of California, have invented a certain new and useful invention or Improvement in Double Gates or Valves for Water, Gas, and Steam Purposes, which invention is fully described in the following specification and accompanying drawings, reference being had thereto.

My invention consists in providing a double-inclined wedge or chuck, made in one piece, which is arranged within a suitable carriage or frame, so as to operate against the conical or beveled faces of rotary valves, and thus cause them to expand and contract equally when the carriage is moved, as will be hereinafter more fully described.

In the accompanying drawings, Figure 1 is a side elevation of my double water, steam, or gas gate or valve. Fig. 2 is a side view. Fig. 3 is a vertical section. Fig. 4 is a perspective view of carriage. Fig. 5 is a plan of my inclined wedge or chuck. Fig. 6 is a section of valve-guide. Fig. 7 is a plan of valves.

A represents the shell, having two ways and double seats, B B, and valve-guides B', the stem C of which extends up through the double nut and stuffing-box, as shown. The double valve-seats in the shell are ground and made smooth to receive the valves and make the gate steam and water tight.

In the chamber of the gate I place a carriage, D, which is open at the top and perforated at the sides D', to receive the conical projecting faces *a a* of the valves E.

In the carriage D, I place a wedge or chuck, F, which is four-sided, each side being equal, and having inclined ways *b b b b*, converging to the centers, so that whichever way the wedge is placed in the carriage the conical faces of the valves or gates will be operative on its double face, the ends of the wedge extending loosely through the opening *c* in the ends of the carriage, the said wedge being provided with shoulders to govern its movements within the carriage.

The lower end of the stem or spindle is provided with a screw-thread, *d*, which operates in a nut, D'', in the end of the carriage, and extends into the hollow end or tube *e* of the wedge, so as to move the inclined wedge in the carriage forward and back against the conical surface of the valves or gates, and expand their outer faces against the seats to tightly close the outlets by turning the spindle, and by a reverse motion to release the gates or valves, so that the ports *f f* will be opened simultaneously by the threaded spindle passing entirely through the hollow wedge with inclined faces when it is desired to raise the gates.

Thus it will be seen that by turning the stem the gates can be opened partially at any point of the ports, or wholly opened at will, while the weight of the stem is supported in the cap and packing of the shell in a true vertical or horizontal line by means of the carriage and wedge, so that it cannot be bent from its true position.

Having thus described my invention, what I claim, and desire to secure by Letters Patent, is—

1. In combination with the screw-threaded stem C and carriage D, provided with a nut, D'', at its upper end, in which the stem operates, the wedge F, having double-inclined faces *b b* thereon, so that when the wedge and carriage are moved the faces of the wedge will cause the valves to expand or contract, substantially as described.

2. The combination of the screw-threaded stem C, traveling carriage D, double-inclined wedge F, and rotary valves E E, arranged to operate substantially as and for the purpose specified.

In testimony that I claim the foregoing I have hereunto set my hand and seal this 30th day of October, 1879.

PHILIP GIOVANNINI. [L. S.]

Witnesses:
C. W. M. SMITH,
PHILIP MAHLER.